(12) United States Patent
Yoneda

(10) Patent No.: US 10,916,048 B2
(45) Date of Patent: Feb. 9, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Keigo Yoneda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 119 days.

(21) Appl. No.: 16/244,688

(22) Filed: Jan. 10, 2019

(65) Prior Publication Data

US 2019/0221029 A1 Jul. 18, 2019

(30) Foreign Application Priority Data

Jan. 17, 2018 (JP) .................. 2018-005732

(51) Int. Cl.
*G06K 9/00* (2006.01)
*G06T 15/20* (2011.01)
(Continued)

(52) U.S. Cl.
CPC ............... *G06T 15/20* (2013.01); *G06T 7/70* (2017.01); *G06T 7/80* (2017.01); *H04N 5/247* (2013.01); *G06T 2210/36* (2013.01)

(58) Field of Classification Search
CPC ....... G06T 15/20; G06T 15/205; G06T 15/00; G06T 15/405; G06T 7/70; G06T 7/80; G06T 7/55; G06T 7/596; G06T 7/73; G06T 7/97; G06T 7/557; G06T 2210/36; G06T 13/20; G06T 13/00; G06T 17/00; G06T 19/00; G06T 2215/16; G06T 2207/10012; G06T 2207/10028; G06T 2207/10052; H04N 5/247; H04N 5/2224; H04N 5/23206; H04N 5/23229; H04N 13/111; H04N 13/117; H04N 13/139; H04N 13/156;
(Continued)

(56) References Cited

U.S. PATENT DOCUMENTS 10,429,923 B1 * 10/2019 Johnston ................. G06F 3/011
2019/0012824 A1 * 1/2019 Sun .......................... G06F 3/013
(Continued)

FOREIGN PATENT DOCUMENTS

JP 2016063537 A 4/2016

*Primary Examiner* — Jose L Couso
(74) *Attorney, Agent, or Firm* — Carter, Deluca & Farrell LLP

(57) ABSTRACT

An image processing apparatus that generates a virtual viewpoint image based on images obtained by a plurality of cameras that capture an image capturing area from a plurality of directions and on viewpoint information indicating a position and direction of a virtual viewpoint, the image processing apparatus including: a determining unit configured to determine a priority of an object in the image capturing area; a control unit configured to control a display manner of the object in the virtual viewpoint image, based on the priority of the object determined by the determining unit, so that processing time related to generation of the virtual viewpoint image does not exceed a predetermined amount of time; and a generating unit configured to generate the virtual viewpoint image according to control by the control unit.

19 Claims, 9 Drawing Sheets

(51) Int. Cl.
*H04N 5/247* (2006.01)
*G06T 7/80* (2017.01)
*G06T 7/70* (2017.01)

(58) Field of Classification Search
CPC .. H04N 13/194; H04N 13/167; H04N 13/189;
H04N 13/239; H04N 13/296; H04N
13/243; H04N 13/282; H04N 13/383;
H04N 13/398; H04N 9/045; H04N 9/09;
G02B 2027/0138; G02B 2027/014; G06K
9/3241; G06K 9/00369; G06K 9/00744;
G06K 2009/2045; B60R 1/00; G06F
3/04815; G06F 3/011; A63F 2300/6661;
A63F 2300/6653; A63F 2300/6684; A63F
2300/8082; A63F 13/5258
See application file for complete search history.

(56) References Cited

U.S. PATENT DOCUMENTS

| 2019/0174109 | A1* | 6/2019 | Yoshikawa | H04N 13/117 |
| 2020/0034989 | A1* | 1/2020 | Koyama | G06T 7/80 |
| 2020/0036952 | A1* | 1/2020 | Iwane | H04N 13/156 |
| 2020/0128232 | A1* | 4/2020 | Hwang | A61B 5/163 |

* cited by examiner

IMAGE PROCESSING APPARATUS, IMAGE PROCESSING METHOD, AND STORAGE MEDIUM

BACKGROUND OF THE INVENTION

Field of the Invention

The present invention relates to a technique of generating a virtual viewpoint image, based on images captured by image capturing devices corresponding to multiple viewpoints.

Description of the Related Art

Attention is drawn to a technique of placing multiple image capturing devices at different positions and generating a three-dimensional (3D) model or a virtual viewpoint image by use of multiple images captured by the respective image capturing devices.

To generate a high-quality virtual viewpoint image, it is necessary to render a high-precision 3D model and a high-resolution virtual viewpoint image, which takes significant processing time for generating a virtual viewpoint image. For this reason, there is increase in delay time (or latency) from when a user inputs information related to a desired virtual viewpoint to when the virtual viewpoint image with the information reflected is displayed. On the other hand, there is a demand from users to watch a virtual viewpoint image in real time with the least delay possible. To attend to this demand, it is necessary to reduce an amount of time for a process of generating a virtual viewpoint image.

Japanese Patent Laid-Open No. 2016-63537 (hereinafter referred to as Document 1) discloses a configuration in which, from an image frame obtained by capturing an image of an object, a high-resolution image of an area including a gazing point and a low-resolution image representing the entire area of the image frame are generated and data of a lateral line of the images is output on a line by line basis.

However, in the technology of Document 1, a process load for rendering a virtual viewpoint image is not taken into consideration. For example, rendering of a virtual viewpoint image includes a process of extracting an object to be a foreground and deriving a 3D model. Particularly, with increase in the proportion of objects to be a foreground, a process load required for rendering increases, which results in increase in delay. In a case where a processing amount is simply reduced to attend to such delay, image quality of a generated virtual viewpoint image may be deteriorated. For example, in a scene of sports such as a soccer game, in a case of reducing a processing amount, there is a risk of generating a virtual viewpoint image in which a player's face or jersey number, etc., cannot be recognized.

SUMMARY OF THE INVENTION

An image processing apparatus according to an embodiment of the present invention is an image processing apparatus for generating a virtual viewpoint image based on images and viewpoint information, the images being obtained by a plurality of cameras that capture an image capturing area from a plurality of directions, the viewpoint information indicating a position and direction of a virtual viewpoint, the image processing apparatus including: a determining unit configured to determine a priority of an object in the image capturing area; a control unit configured to control a display manner of the object in the virtual viewpoint image, based on the priority of the object determined by the determining unit, so that processing time related to generation of the virtual viewpoint image does not exceed a predetermined amount of time; and a generating unit configured to generate the virtual viewpoint image according to control by the control unit.

Further features of the present invention will become apparent from the following description of exemplary embodiments with reference to the attached drawings.

DESCRIPTION OF THE EMBODIMENTS

Hereinafter, a detailed explanation is given of preferred embodiments of the present invention with reference to the accompanying drawings. Noted that the present invention is not limited to the following embodiments and all combinations of the characteristics explained in the present embodiments are not necessarily essential to the solution means proposed in the present invention.

First Embodiment

In the first embodiment, an explanation is given of processing of generating a virtual viewpoint image by changing a resolution of the region of each model constituting the virtual viewpoint image in accordance with the process load required for rendering the virtual viewpoint image.

<System Configuration>

Figure 1:
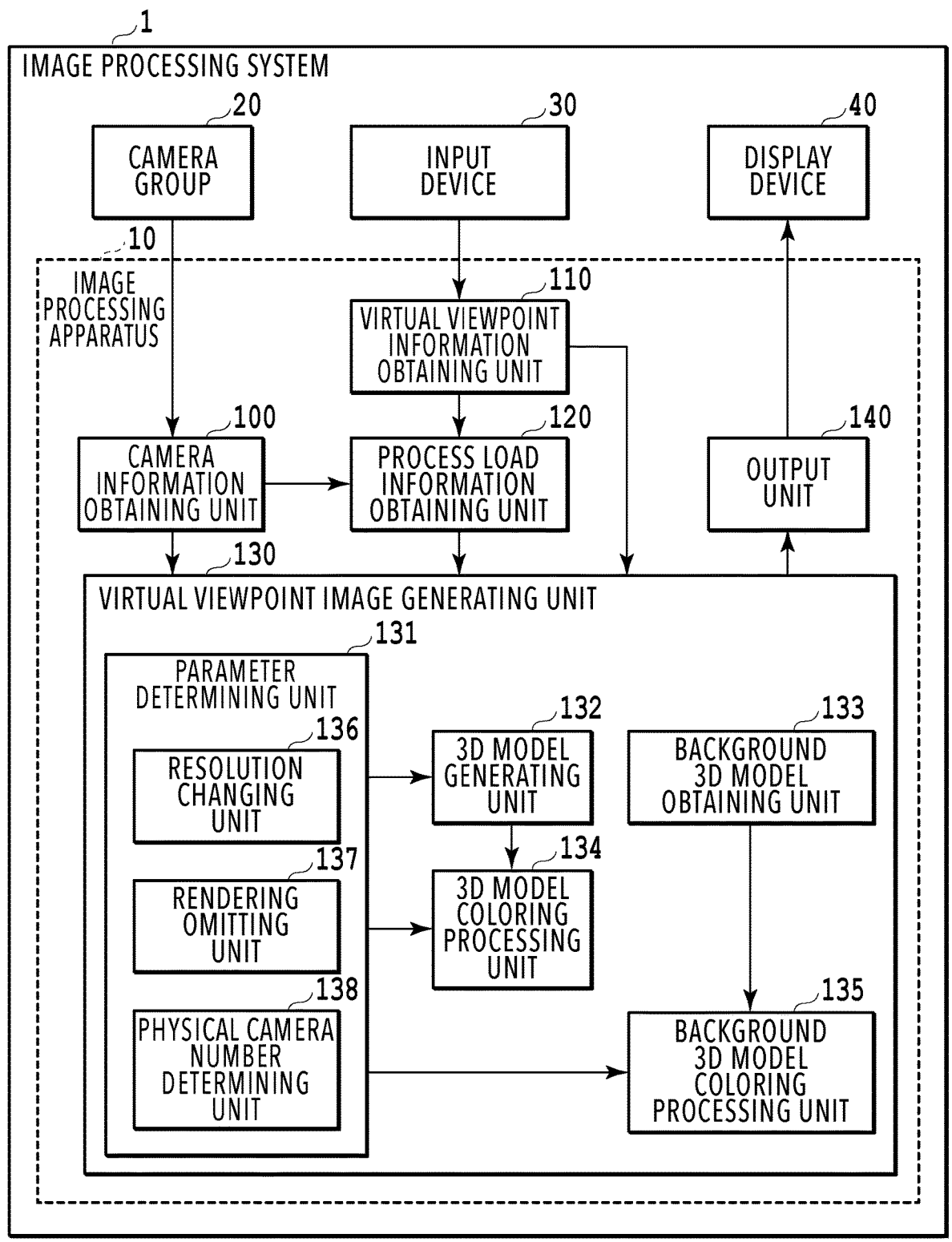
FIG. 1 is a diagram illustrating an example of a configuration of an image processing system.

FIG. 1 is a diagram illustrating a configuration of an image processing system. The image processing system 1 obtains process load information indicating a process load for rendering a virtual viewpoint image and changes a parameter related to the rendering according to the process load information, so as to generate and output the virtual viewpoint image. The image processing system 1 includes an image processing apparatus 10, a camera group 20, an input device 30, and a display device 40.

The image processing apparatus 10 includes a camera information obtaining unit 100, a virtual viewpoint information obtaining unit 110, a process load information obtaining unit 120, a virtual viewpoint image generating unit 130, and an output unit 140. The image processing apparatus 10 is connected to the camera group 20, the input device 30, and the display device 40.

The camera information obtaining unit 100 obtains camera information from the camera group 20 as input. The camera information includes: captured image data, which is obtained by capturing an image capturing area from multiple directions by use of multiple cameras; an extrinsic parameter of each camera; and an intrinsic parameter of each camera, etc. The camera information obtaining unit 100 outputs the obtained camera information to the process load information obtaining unit 120 and the virtual viewpoint image generating unit 130. An extrinsic parameter of a camera is a parameter indicating the position and orientation of a camera (for example, a rotation matrix and a position vector, etc.). An intrinsic parameter of a camera is an intrinsic parameter specific to a camera, such as a focal length, an image center, and a lens distortion parameter.

The virtual viewpoint information obtaining unit 110 obtains virtual viewpoint information, which is input by an operator through the input device 30, and outputs the virtual viewpoint information to the process load information obtaining unit 120 and the virtual viewpoint image generating unit 130. The virtual viewpoint information includes information indicating the position and orientation (i.e., direction) of a virtual viewpoint. In addition, the virtual viewpoint information may include a designated parameter, which is designated by an operator through the UI screen explained in the fourth embodiment described later (c.f., FIG. 9), etc.

The process load information obtaining unit 120 obtains process load information indicating a process load required for rendering a virtual viewpoint image, based on camera information, which is input from the camera information obtaining unit 100, and virtual viewpoint information, which is input from the virtual viewpoint information obtaining unit 110. The process load information obtaining unit 120 outputs the obtained process load information to the virtual viewpoint image generating unit 130. The method for obtaining the process load information is explained with reference to the processing of the later-described flowchart.

The virtual viewpoint image generating unit 130 generates virtual viewpoint image data by rendering a virtual viewpoint image, based on the camera information, which is obtained from the camera information obtaining unit 100, and the virtual viewpoint information, which is obtained from the virtual viewpoint information obtaining unit 110. The generated virtual viewpoint image data is output to the output unit 140. The virtual viewpoint image generating unit 130 includes a parameter determining unit 131, a 3D model generating unit 132, a background 3D model obtaining unit 133, a 3D model coloring processing unit 134, and a background 3D model coloring processing unit 135. The 3D model generating unit 132, the background 3D model obtaining unit 133, the 3D model coloring processing unit 134, and the background 3D model coloring processing unit 135 function as a rendering processing unit.

Rendering of a virtual viewpoint image is performed by generating a 3D shape of an object to be a foreground, based on input virtual viewpoint information and camera information, and by coloring the 3D shape and a background 3D model. An object to be a foreground (hereinafter referred to as a "foreground object") is, for example, a person, a moving object, or the like that exists in the image capturing area of the camera group 20.

Further, the virtual viewpoint image generating unit 130 generates virtual viewpoint images having different image qualities by changing a parameter related to rendering, based on process load information, which is input from the process load information obtaining unit 120. In the virtual viewpoint image generating unit 130, processing time for rendering a virtual viewpoint image increases and decreases in accordance with input camera information and virtual viewpoint information.

There may be a case in which an operator who is watching an image displayed on the display device 40 requests for display of a real-time (i.e., low-delay) virtual viewpoint image. In such a case, an amount of time taken for generating a virtual viewpoint image should be equal to or shorter than a predetermined threshold value. The virtual viewpoint image generating unit 130 determines whether the process of generating a virtual viewpoint image is performed in an amount of time equal to or shorter than a predetermined threshold value. Then, in order to perform generation of a virtual viewpoint image in an amount of time equal to or shorter than the predetermined threshold value, a parameter related to rendering, which is determined by the parameter determining unit 131, is changed in accordance with the process load. As a result, the virtual viewpoint image generating unit 130 outputs a virtual viewpoint image generated by a simplified generation process. This virtual viewpoint image has a different image quality, compared with a virtual viewpoint image generated with a parameter before the change. Noted that a delay in the present embodiment corresponds to an amount of time from when an operator inputs virtual viewpoint information to the input device 30 to when a virtual viewpoint image on which the information is reflected is displayed on the display device 40. However, the definition of a delay is not limited to the above. That is, a delay may correspond to an amount of time from when images are captured by the camera group 20 to when a virtual viewpoint image based on the captured images is displayed, for example.

The parameter determining unit 131 determines a parameter related to rendering, based on process load information indicating a process load required for rendering a virtual viewpoint image, which is input from the process load information obtaining unit 120. For example, the parameter determining unit 131 determines a parameter for performing generation or coloring of a 3D shape (i.e., 3D model) of a foreground object or for performing coloring of a background 3D model. The determined parameter is output to a corresponding generating unit or processing unit, that is, the 3D model generating unit 132, the 3D model coloring processing unit 134, or the background 3D model coloring processing unit 135. The parameter determining unit 131 includes a resolution changing unit 136, a rendering omitting unit 137, and a physical camera number determining unit 138. Details of the resolution changing unit 136, the rendering omitting unit 137, and the physical camera number determining unit 138 are explained with reference to the later-described flowcharts.

The 3D model generating unit 132 estimates a 3D shape of a foreground object (i.e., generates a 3D model), based on a parameter input from the parameter determining unit 131, and outputs the 3D shape to the 3D model coloring processing unit 134. For example, estimation of a 3D shape is performed as follows. First, difference between a captured image including a foreground object, which is input from the camera information obtaining unit 100, and a background image corresponding to each camera, which is obtained in advance, is derived. In this way, a silhouette image, which indicates an extracted portion (i.e., foreground area) corresponding to the foreground object in the captured image, is generated. Then, a 3D model (hereinafter referred to as a "foreground model") is generated by estimating the 3D shape of the foreground object by use of a silhouette image corresponding to each camera and a parameter (e.g., an intrinsic parameter and an extrinsic parameter) of each camera. For estimating the 3D shape, a Visual Hull method is used, for example. As a result of this process, a 3D point group (i.e., a set of points having 3D coordinates) expressing the 3D shape of the foreground object is obtained. Noted that a 3D model may be expressed by information such as a line segment or a plane, other than expression by a 3D point group. The parameter, which is input from the parameter determining unit 131 and used in the above-described process performed by the 3D model generating unit 132, represents, for example, the size of a voxel processed in a Visual Hull method, the number of cameras used for estimating a 3D shape, or the like. Noted that the method for deriving a 3D shape of an object from a captured image is not limited to the above. In a case of deriving a 3D shape in another method, a parameter corresponding to the method may be used.

The background 3D model obtaining unit 133 obtains a background 3D model (hereinafter referred to as a "background model") and outputs the background model to the background 3D model coloring processing unit 135. The background model is, for example, a CG (Computer Graphics) model of a stadium, etc., where the camera group 20 is placed, which is created in advance and stored in the image processing system 1 (for example, stored in the later-described secondary storage device 204 of FIG. 2).

A foreground model generated by the 3D model generating unit 132 and a background model obtained by the background 3D model obtaining unit 133 are rendered in an existing CG rendering method. As a result, it is possible to display a foreground model and a background model in predetermined colors (for example, monotone colors), respectively.

The 3D model coloring processing unit 134 performs a process of coloring the foreground model input from the 3D model generating unit 132, based on the parameter input from the parameter determining unit 131. The process of coloring the foreground includes, for example, a process of determining visibility of a point in the 3D point group, which constitutes the foreground model, and a process of deriving the color of the point. In the process of determining visibility, it is possible to specify cameras that can capture an image of each point, based on positional relations between each point in the 3D point group viewed from the virtual viewpoint and the multiple cameras included in the camera group 20. In the process of deriving the color, for example, a certain point in the 3D point group viewed from the virtual viewpoint is set as a target point. The target point is projected onto an image captured by a camera that can capture the target point. The color of the pixel of the projection destination is set as the color of the target point. Noted that, in a case where an image of the target point can be captured by multiple cameras, the color of the target point is determined by projecting the target point onto each of the images captured by the multiple cameras, obtaining the pixel values of the projection destinations, and calculating the average of the pixel values. By performing such processes while target points are changed, it is possible to generate a colored foreground model viewed from the virtual viewpoint. The parameter input from the parameter determining unit 131 to the 3D model coloring processing unit 134 represents, for example, a resolution of a foreground model, a range for setting a low resolution, a range to be colored, the number of cameras to be used for coloring, or the like. To change a resolution of a foreground model, for example, there is a method of deriving the color of a certain point, so that the same color is applied to the points within a predetermined range of distance from the certain point, instead of deriving the colors of all the points in a 3D point group.

The background 3D model coloring processing unit 135 performs a process of coloring a background model input from the background 3D model obtaining unit 133, based on a parameter input from the parameter determining unit 131. In a method of coloring a background model, for example, vertices (e.g., points corresponding to the edges of a stadium) of a background model are firstly set, and then the vertices are projected onto the coordinate systems of two cameras (i.e., a first camera and a second camera) near a virtual viewpoint and onto the coordinate system of the virtual viewpoint. Further, by use of the corresponding points of the virtual viewpoint and the first camera and the corresponding points of the virtual viewpoint and the second camera, the first projection matrix between the virtual viewpoint and the first camera and the second projection matrix between the virtual viewpoint and the second camera are calculated. Further, by use of the first projection matrix and the second projection matrix, each pixel of the background image is projected onto the image captured by the first camera and the image captured by the second camera, and the average of the two pixel values of the projection destinations is calculated, so as to determine the pixel value of the background image. Noted that pixel values of the background image may be determined in the same method, based on images captured by three or more cameras. In this way, a colored background model viewed from a virtual viewpoint can be generated. The parameter input from the parameter determining unit 131 to the background 3D model obtaining unit 133 represents, for example, a resolution of a background model, a range for setting a low resolution, a range to be colored, the number of cameras to be used for coloring, or the like.

The output unit 140 outputs virtual viewpoint image data, which is input from the virtual viewpoint image generating unit 130, to the display device 40. In addition, the output unit 140 controls the display device 40 to display the later-described UI screen illustrated in FIG. 9.

The camera group 20 includes multiple cameras, and the cameras capture a foreground object from different directions (i.e., from multiple viewpoints), respectively. Then, a captured image, an extrinsic parameter, an intrinsic parameter, etc., of each camera are transmitted to the image processing apparatus 10.

The input device 30 accepts designation of a virtual viewpoint for generating a virtual viewpoint image and transmits information according to the designation to the image processing apparatus 10. For example, the input device 30 includes an input unit such as a joystick, a jog dial, a touch-sensitive panel, a keyboard, or a mouse, and an operator who designates a virtual viewpoint operates the input unit to designate the position and orientation of a virtual viewpoint. Information about the designated position and orientation of a virtual viewpoint is transmitted to the image processing apparatus 10 as virtual viewpoint information.

Although, in the present embodiment, an explanation is given with an example of a case in which the viewer of a virtual viewpoint image and the operator of virtual viewpoint information are the same user, the present embodiment is not limited thereto. That is, the viewer and the operator may be different users. Further, information transmitted by the input device 30 is not limited to information about the position and orientation of a virtual viewpoint and may be a designated parameter for generating a virtual viewpoint image, which is designated by a user through the later-described UI screen illustrated in FIG. 9.

The display device 40 displays a virtual viewpoint image, based on virtual viewpoint image data generated and output by the image processing apparatus 10. The virtual viewpoint image to be displayed is, for example, a virtual viewpoint image generated by the image processing apparatus 10 as a result of input of virtual viewpoint information by the input device 30. For example, in the initial state, the image processing apparatus 10 generates a virtual viewpoint image P1 (having a low resolution, for example) by use of virtual viewpoint information stored in the input device 30 in advance (or at the time of the previous termination) as initial information. The display device 40 displays such a virtual viewpoint image P1 in the initial state. Then, the operator watches the virtual viewpoint image P1 displayed on the display device 40 and designates the next virtual viewpoint information through the input device 30. A virtual viewpoint image P2, which is generated in accordance with the designation, is displayed on the display device 40. In this way, the operator can designate a virtual viewpoint by use of the input device 30 while watching a virtual viewpoint image displayed on the display device 40. Noted that, although, in the present embodiment, it is assumed that the operator watching the display device 40 displaying a virtual viewpoint image operates to transmit a virtual viewpoint to the image processing apparatus 10 by use of the input device 30, the present embodiment is not limited thereto. That is, the operators who operate the input device 30 and the display device 40 may not be the same.

<Hardware Configuration of Image Processing Apparatus>

Figure 2:
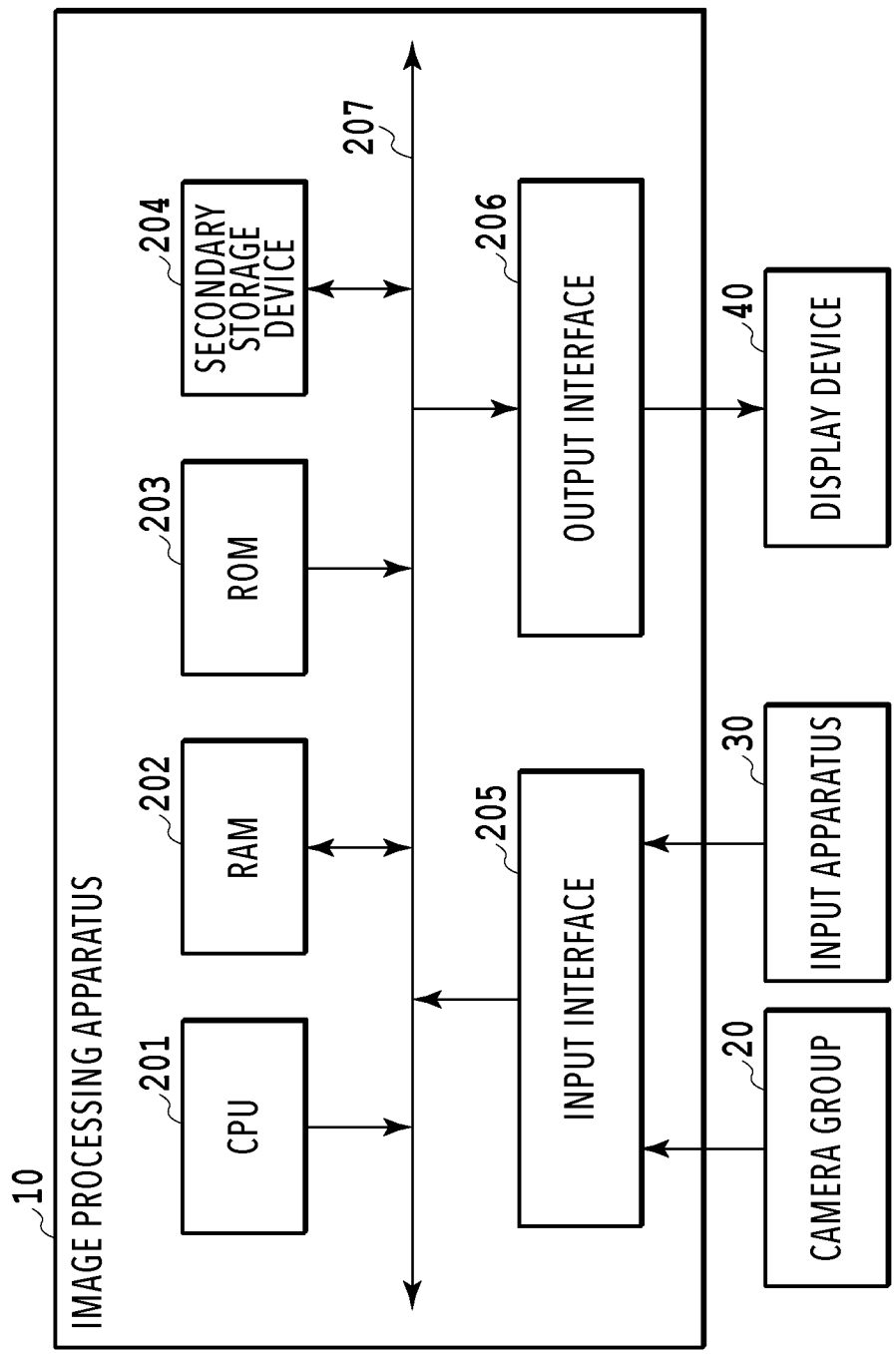
FIG. 2 is a diagram illustrating an example of a configuration of an image processing apparatus.

FIG. 2 is a diagram illustrating an example of a hardware configuration of the image processing apparatus 10 according to the present embodiment. The image processing apparatus 10 according to the present embodiment includes a CPU 201, a RAM 202, a ROM 203, a secondary storage device 204, an input interface 205, and an output interface 206. The components of the image processing apparatus 10 are mutually connected via a system bus 207. Further, the image processing apparatus 10 is connected to the camera group 20 and the input device 30 via the input interface 205 and is connected to the display device 40 via the output interface 206.

The CPU 201 is a processor that executes a program stored in the ROM 203, using the RAM 202 as a work memory, and comprehensively controls each component of the image processing apparatus 10 via the system bus 207. Accordingly, the CPU 201 functions as each unit of the image processing apparatus 10 illustrated in FIG. 1.

The secondary storage device 204 is a storage device that stores various types of data to be processed by the image processing apparatus 10. In the present embodiments, an HDD is used. The CPU 201 is capable of writing data on the secondary storage device 204 and reading data stored in the secondary storage device 204 via the system bus 207. Noted that, other than an HDD, various types of storage devices such as an optical disk drive or a flash memory may be used as the secondary storage device 204.

The input interface 205 is, for example, a serial bus interface such as USB or IEEE 1394. Input of data, an instruction, etc., from an external apparatus to the image processing apparatus 10 is performed via the input interface 205. The image processing apparatus 10 obtains camera information and virtual viewpoint information from the camera group 20 and the input device 30 via the input interface 205. Noted that input devices such as a mouse and a button (not illustrated) may be connected to the input interface 205 as well. In the same manner as the input interface 205, the output interface 206 includes a serial bus interface such as USB or IEEE 1394. Alternatively, for example, it is possible to use a video output terminal such as DVI or HDMI as well. Output of data, etc., from the image processing apparatus 10 to an external apparatus is performed via the output interface 206. The image processing apparatus 10 outputs virtual viewpoint image data to the display device 40 (e.g., various types of image displaying devices such as a liquid crystal display) via the output interface 206, so as to display a virtual viewpoint image. Noted that, although the image processing apparatus 10 may include components other than those described above, explanation thereof is omitted here. Further, although an explanation has been given with the example in which the image processing apparatus 10 is configured with a single apparatus, the present embodiment is not limited thereto. Each unit illustrated in FIG. 1 may be realized by multiple divided apparatuses.

<Explanation of Process Load>

Figure 3A:
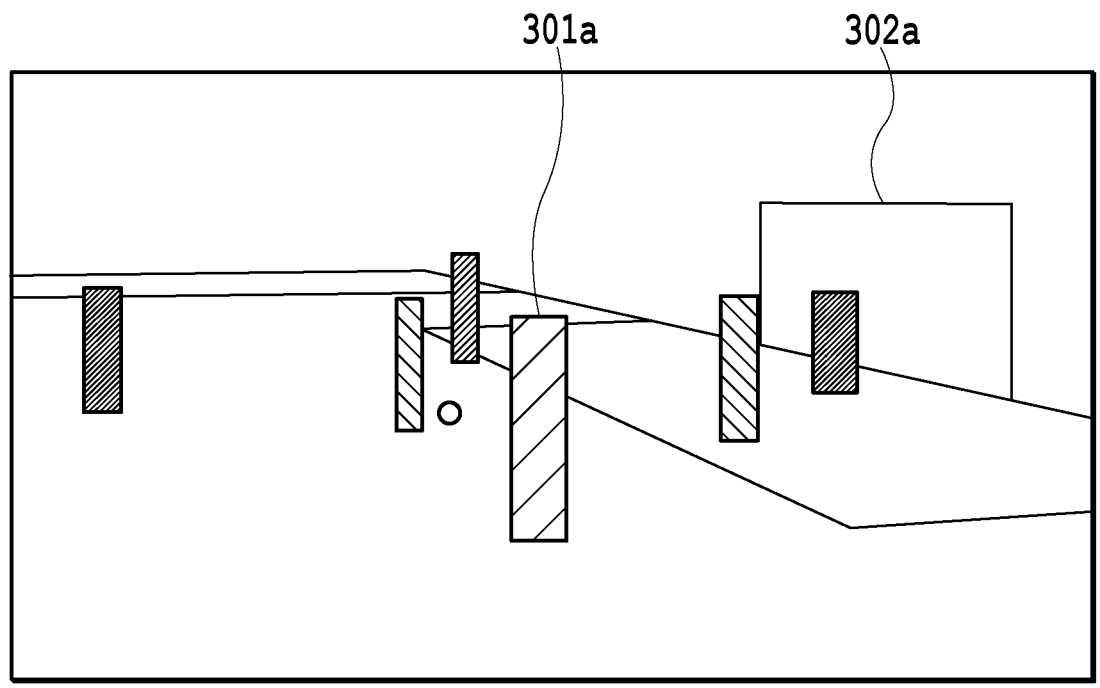
FIGS. 3A and 3B are schematic diagrams of a virtual viewpoint image.
Figure 3B:
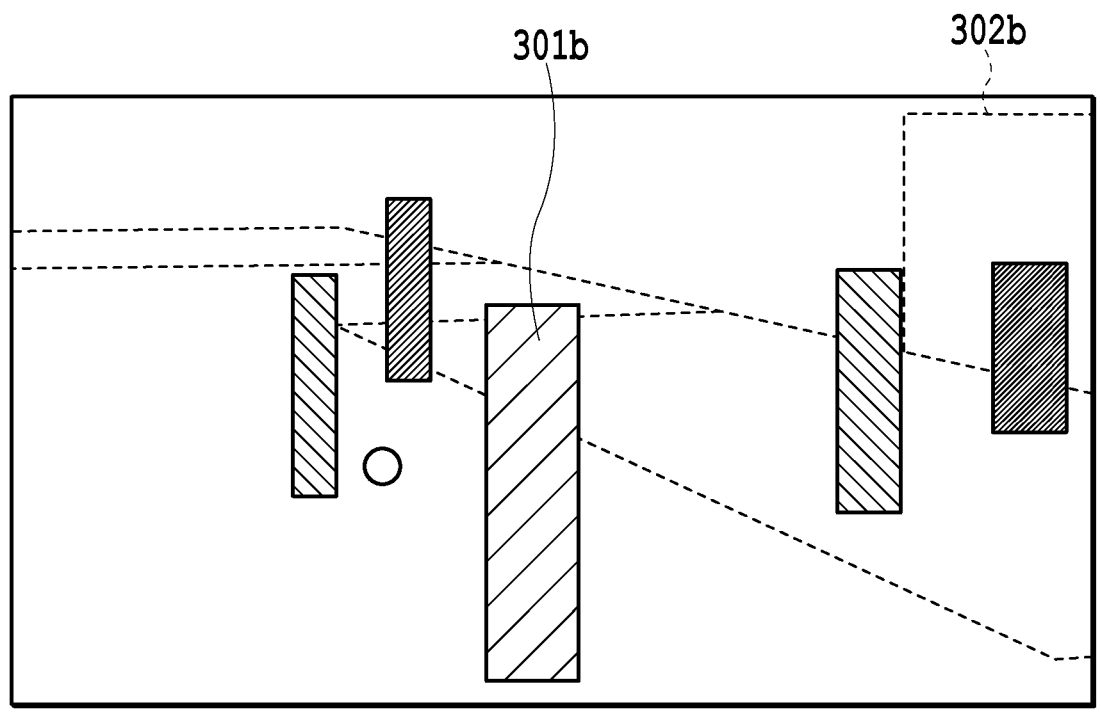

FIGS. 3A and 3B are schematic diagrams of a virtual viewpoint image generated such that the area of each model constituting the virtual viewpoint image has a different resolution. By use of virtual viewpoint images, highlight scenes of a soccer or basketball game, for example, can be viewed from various angles, so that it is possible to give a user a highly realistic feeling, compared with normal images. Each of FIGS. 3A and 3B illustrates a schematic diagram of a virtual viewpoint image in a scene of a soccer game. FIGS. 3A and 3B are images of the same scene. Note that FIG. 3B is an image from a viewpoint, where the virtual viewpoint has become closer to (or has zoomed in on) a foreground object 301, compared to FIG. 3A. In FIGS. 3A and 3B, the areas to be rendered are the foreground object 301 and the background 302. Note that, in a case of explaining configurations that are common in the present specification, branch numbers at the end of reference signs (i.e., "a" and "b", in the examples of FIGS. 3A and 3B) may be omitted. In FIGS. 3A and 3B, the hatched models are foreground objects, and the other is the background model.

In the present embodiment, it is assumed that a process load required for rendering a virtual viewpoint image is a proportion (hereinafter referred to as a "foreground rate") of foreground objects to the virtual viewpoint image. With increase in the foreground rate, processing time for rendering the virtual viewpoint image increases. This is because the process load in the 3D model generating unit 132 and the 3D model coloring processing unit 134 increases with increase of foreground objects. FIG. 3A illustrates an example of the case in which the virtual viewpoint image generating unit 130 determines that generation of a virtual viewpoint image can be completed in an amount of time equal to or shorter than a predetermined threshold value, based on process load information (i.e., foreground rate) obtained by the process load information obtaining unit 120. Therefore, the parameter determining unit 131 determines parameters for rendering both the foreground object 301a and the background 302a at high resolutions. Accordingly, a virtual viewpoint image in which the foreground object 301a and the background 302a are rendered at high resolutions is displayed. On the other hand, FIG. 3B is an image from a viewpoint, where the virtual viewpoint has become closer to (or has zoomed in on) the foreground object 301, compared to FIG. 3A, and therefore, the foreground rate is higher than the case of FIG. 3A. In the case of FIG. 3B, based on process load information (i.e., foreground rate) obtained by the process load information obtaining unit 120, the virtual viewpoint image generating unit 130 determines that a virtual viewpoint image cannot be generated in an amount of time equal to or shorter than a predetermined threshold value. Then, the parameter determining unit 131 determines parameters for rendering the foreground object 301*b* at a high resolution and, on the other hand, determines parameters for rendering the background 302*b* at a low resolution. Accordingly, a virtual viewpoint image in which the foreground object 301*b* is rendered at a high resolution and the background 302*b* is rendered at a low resolution is displayed. As a result of such processing, rendering of a background is processed at a high speed, so that a virtual viewpoint image can be generated in an amount of time equal to or shorter than a predetermined threshold value and displayed on the display device 40.

Note that, although, in the examples of FIGS. 3A and 3B, an explanation is given of the case in which areas to be rendered at different resolutions are a foreground object and a background, the present embodiment is not limited thereto. It is possible that an electronic public notice area or other CG objects, etc., may be added as an area to be rendered at a different resolution. Further, it is possible that a given range in the 3D space or a range corresponding to a distance from a virtual camera, etc., may an area to be rendered at a different resolution. Furthermore, although a foreground rate is used as an example of the process load required for rendering in the present embodiment, the present embodiment is not limited thereto. That is, it is also possible to watch a utilization rate of a CPU or a memory and use the utilization rate as the process load required for rendering. Moreover, for example, the process load may be determined by use of other information such as the number of objects to be a foreground and complexity of the shape of an object to be a foreground.

<Flowchart>

Figure 4:
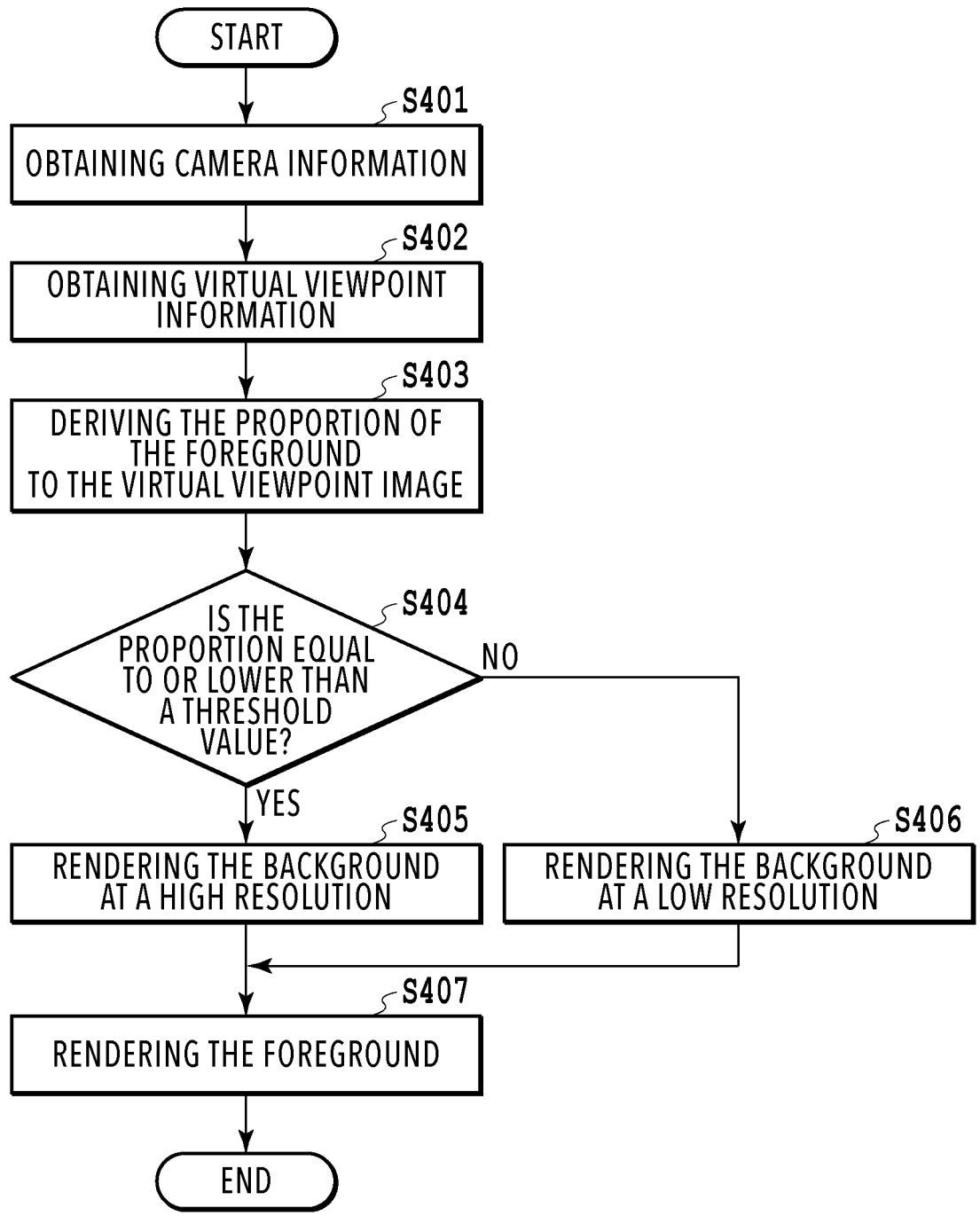
FIG. 4 is a flowchart illustrating an example of image processing.

FIG. 4 is a flowchart explaining the flow of the processing in the first embodiment. The processing illustrated in FIG. 4 is realized by a program stored in the ROM 203, which is read into the RAM 202 and executed by the CPU 201. Note that a part or all of the steps in each of the later-described flowcharts may be realized by dedicated hardware. The dedicated hardware may be, for example, an ASIC, an FPGA, a GPU, or the like.

At Step S401, the camera information obtaining unit 100 obtains captured image data of an image captured by each camera of the camera group 20 and camera information such as an intrinsic parameter and an extrinsic parameter of each camera.

At Step S402, the virtual viewpoint information obtaining unit 110 obtains, from the input device 30, virtual viewpoint information such as the position and orientation of a virtual viewpoint and a designated parameter (described later in the fourth embodiment) for generating a virtual viewpoint image.

At Step S403, the process load information obtaining unit 120 derives the proportion (i.e., foreground rate) of foreground objects to the virtual viewpoint image, based on the obtained camera information and virtual viewpoint information. The method for deriving the foreground rate is, for example, obtaining camera information of only a small number of cameras from the camera information obtaining unit 100, so as to generate 3D point groups of foreground objects with coarse granularity in a short time, compared to the case of using all the cameras. Then, virtual viewpoint information is obtained from the virtual viewpoint information obtaining unit 110 and the 3D point groups of the foreground objects with coarse granularity are projected onto the virtual viewpoint image corresponding to the virtual viewpoint specified by the virtual viewpoint information, so as to find the area of the 3D point groups of the foreground objects on the image. As described above, by finding a foreground rate by use of camera information of a part of all the cameras, it is possible to roughly calculate the proportion of foreground objects of the case in which 3D point groups are generated by use of all the cameras. That is, it is possible to estimate and obtain the process load for rendering a virtual viewpoint image. Noted that the process load may be estimated, based on the number of foreground objects in a virtual viewpoint image, regardless of the size of the foreground objects.

At step S404, the virtual viewpoint image generating unit 130 determines whether the process load is equal to or less than a predetermined threshold value. For example, the virtual viewpoint image generating unit 130 determines whether the foreground rate is equal to or lower than a predetermined threshold value. In a case where the foreground rate is equal to or lower than the predetermined threshold value, the processing proceeds to Step S405. In a case where the foreground rate is not equal to or lower than the predetermined threshold value, the processing proceeds to Step S406.

At Step S405 or S406, the resolution changing unit 136 determines parameters for a resolution of the background in accordance with the process load information indicating the process load required for rendering the virtual viewpoint image, which is obtained from the process load information obtaining unit 120. Then, the determined parameters are output to the background 3D model coloring processing unit 135. In the case where the foreground rate is equal to or lower than the predetermined threshold value, the resolution changing unit 136 determines parameters at Step S405 such that the background is rendered (i.e., drawn) at a high resolution. The background 3D model obtaining unit 133 obtains the background model and transmits the background model to the background 3D model coloring processing unit 135. The background 3D model coloring processing unit 135 renders the background at a high resolution, based on the parameters for rendering at a high resolution, which is output from the parameter determining unit 131. Then, the processing proceeds to Step S407. Contrarily, in the case where the foreground rate is not equal to or lower than the predetermined threshold value, the resolution changing unit 136 determines parameters at Step S406 such that the background is rendered at a low resolution. The background 3D model obtaining unit 133 obtains the background model and transmits the background model to the background 3D model coloring processing unit 135. The background 3D model coloring processing unit 135 renders the background at a low resolution, based on the parameters for rendering at a low resolution, which is output from the parameter determining unit 131. Then, the processing proceeds to Step S407.

At Step S407, the 3D model generating unit 132 obtains parameters related to estimation of the 3D shapes of the foreground objects from the parameter determining unit 131 and generates foreground models. Then, the 3D model coloring processing unit 134 obtains parameters related to coloring of the foreground models from the parameter determining unit 131 and performs coloring of the foreground, based on the parameters.

As explained above, the processing performed in the present embodiment includes: obtaining process load information indicating the process load required for rendering a virtual viewpoint image; and changing resolutions in accordance with priority of areas of respective models constituting the virtual viewpoint image. For example, a foreground model is preferentially drawn at a higher resolution, compared to a background model. According to such processing, generation of a virtual viewpoint image can be completed in a processing time equal to or shorter than a predetermined threshold value. Note that, among background models, resolutions may be different between a model of a structure with high importance such as a soccer goal and a model with low importance such as the ground.

Note that, although the configuration in which the resolution changing unit 136 changes resolution of a background is explained in the present embodiment, the present embodiment is not limited thereto. For example, foreground objects may be rendered at a low resolution. Alternatively, resolution of a foreground object may be changed into the first resolution and resolution of a background may be changed into the second resolution, which is lower than the first resolution. Furthermore, resolution of a foreground object or a background may be changed, based on the distance from a viewpoint. Moreover, resolution of an excessively large foreground object may be changed into a low resolution. Besides, it is possible to identify a face and a jersey number, so as to render the face and the jersey number at a high resolution and renders things other than the face and the jersey number at a low resolution. Further, the above configurations may be combined. As described above, to change resolution of a foreground model, for example, there is a method of calculating the color of a certain point, so that the same color is applied to the points within a predetermined range of distance from the certain point, instead of calculating the colors of all the points in a 3D point group. As described above, to change resolution of a background model, there is a method of changing the range to be colored, changing the number of cameras used for coloring, or the like.

In this way, by changing resolutions in accordance with priority of the areas of respective models constituting a virtual viewpoint image, it is possible to render an area at a high resolution as desired by an operator and to keep an amount of time required for generating the virtual viewpoint image equal to or shorter than a predetermined threshold value. In addition, since a virtual viewpoint image having a resolution corresponding to a processing amount is generated, it is possible to reduce delay and reduce excessive deterioration in image quality of a virtual viewpoint image as well.

Second Embodiment

In the first embodiment, an explanation is given with the example of a configuration in which the resolution changing unit 136 outputs parameters for changing resolutions and rendering is performed according to the output parameters so that a processing delay is reduced. Note that the method for controlling a display manner of an object such that processing time related to generation of a virtual viewpoint image does not exceed a predetermined amount of time is not limited to the method of controlling a resolution related to displaying of an object. In the present embodiment, an explanation is given of a method of generating a virtual viewpoint image by controlling whether or not to display an object (whether or not to omit rendering) for the area of each model constituting the virtual viewpoint image in accordance with the process load required for rendering the virtual viewpoint image. In the same manner as the first embodiment, it is assumed that the process load is the proportion of foreground objects to a virtual viewpoint image. Additionally, the area to be rendered is also the same as in the first embodiment.

Figure 5A:
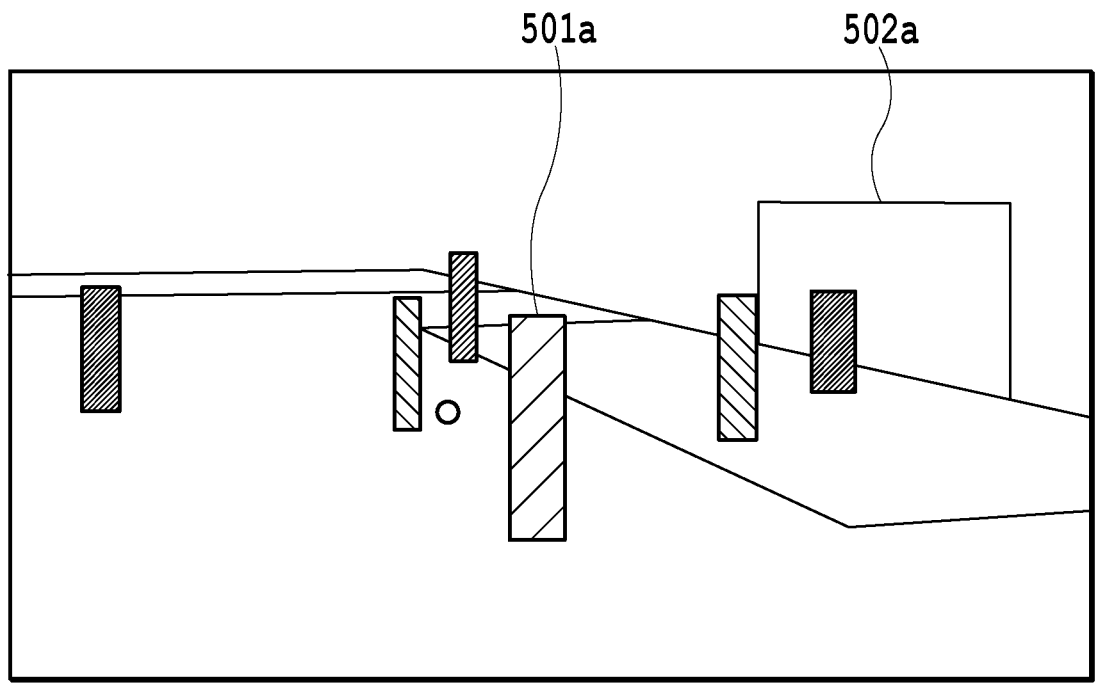
FIGS. 5A and 5B are schematic diagrams of a virtual viewpoint image.
Figure 5B:
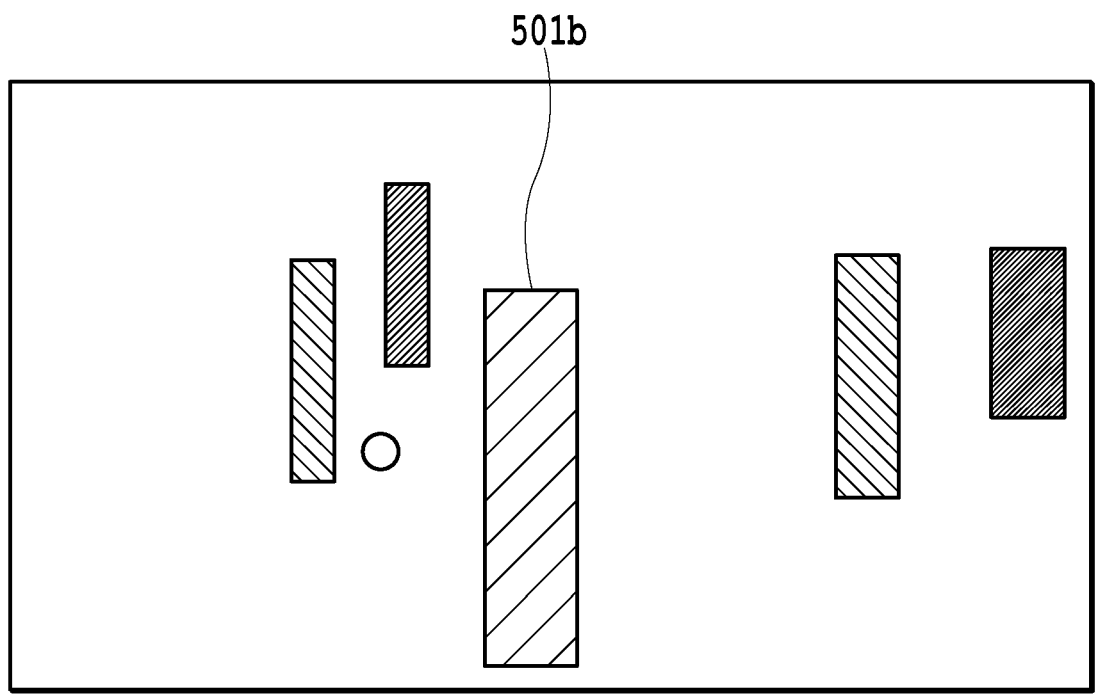

FIGS. 5A and 5B are schematic diagrams of a virtual viewpoint image generated by omitting rendering the area of each model constituting the virtual viewpoint image. FIG. 5A is the same as FIG. 3A of the first embodiment. FIG. 5B is an image from a viewpoint, where the virtual viewpoint has become closer to (or zoomed in on) the foreground object 501, compared to FIG. 5A, and therefore, the foreground rate is higher than FIG. 5A. FIG. 5B is a diagram illustrating a case in which the virtual viewpoint image generating unit 130 determines that an amount of time exceeding a predetermined threshold value is required for a process of generating a virtual viewpoint image, based on process load information obtained by the process load information obtaining unit 120. In this case, the virtual viewpoint image generating unit 130 renders the foreground object 501b although rendering of the background 502 is omitted. By omitting rendering of the background 502, it is possible to generate the virtual viewpoint image in an amount of time equal to or shorter than the predetermined threshold value.

Figure 6:
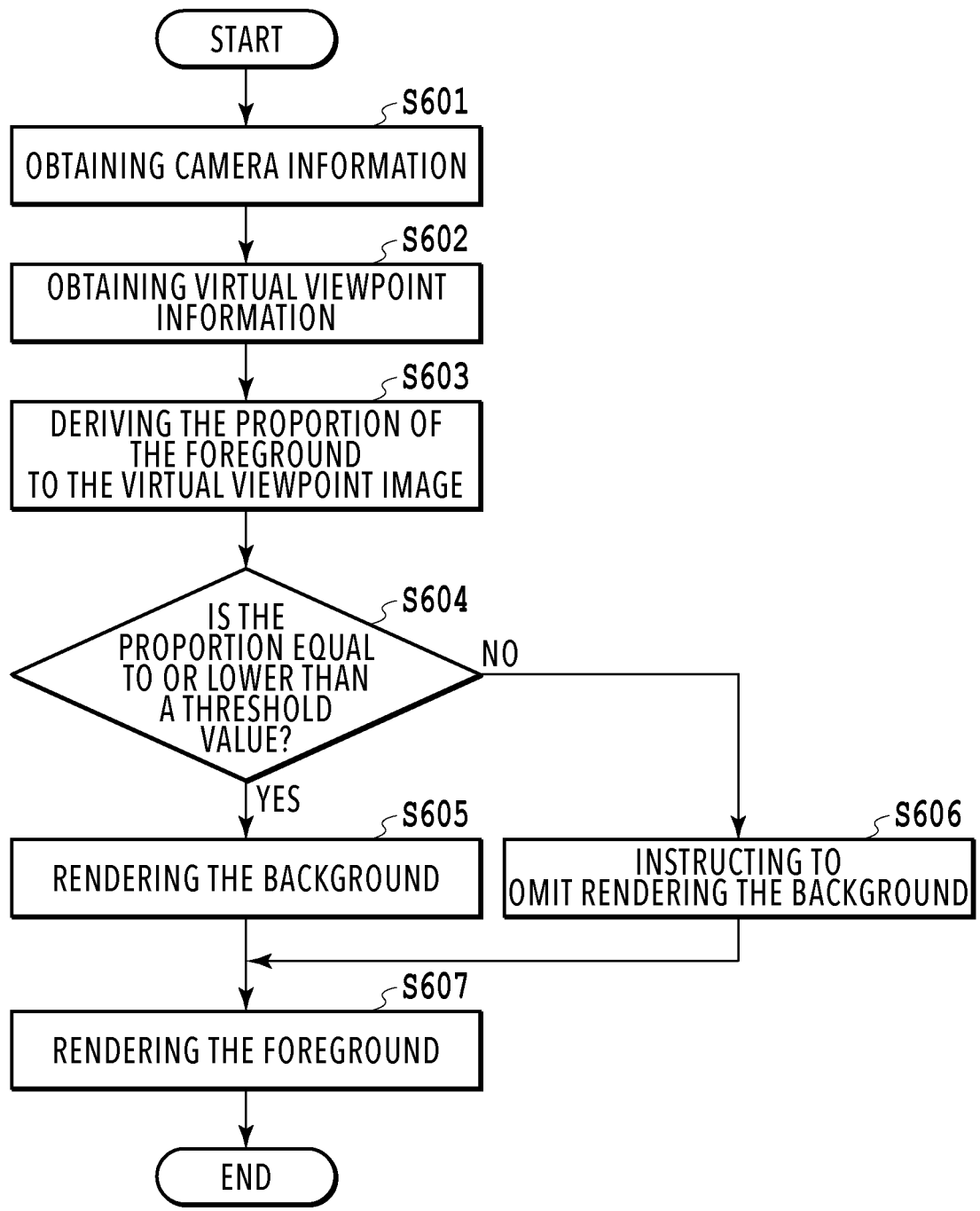
FIG. 6 is a flowchart illustrating an example of image processing.

FIG. 6 is a flowchart explaining the flow of the processing in the present embodiment. Steps S601 through S603 are the same as Steps S401 through S403 of the first embodiment. Further, Step S607 is the same as Step S407 of the first embodiment.

At Step S604, the virtual viewpoint image generating unit 130 determines whether the process load, which is indicated by the process load information obtained from the process load information obtaining unit 120, is equal to or less than a predetermined threshold value. For example, the virtual viewpoint image generating unit 130 determines whether the proportion (i.e., foreground rate) of the foreground objects to the virtual viewpoint image, which is obtained at Step S603, is equal to or lower than a predetermined threshold value. In a case where the proportion is equal to or lower than the predetermined threshold value, the processing proceeds to Step S605, and otherwise, the processing proceeds to Step S606. At Step S605, the parameter determining unit 131 determines parameters for the background. Then, the determined parameters are output to the background 3D model coloring processing unit 135. The background 3D model obtaining unit 133 obtains the background model and transmits the background model to the background 3D model coloring processing unit 135. The background 3D model coloring processing unit 135 renders the background, based on the parameters output from the parameter determining unit 131. Then, the processing proceeds to Step S607. Contrarily, at Step S606, the rendering omitting unit 137 outputs an instruction to omit rendering of the background. In response to this instruction, the background 3D model coloring processing unit 135 omits rendering of the background. Then, the processing proceeds to Step S607.

Note that, although the rendering omitting unit 137 omits rendering of the background in the present embodiment, the present embodiment is not limited thereto. For example, in a case where rendering of a virtual viewpoint image is not completed in an amount of time equal to or shorter than a predetermined threshold value, rendering may be entirely cancelled at a timing where the time corresponding to the predetermined threshold value has come. Furthermore, rendering may be firstly performed at the center of the screen or an area near a gazing point of an operator, and then the rendering may be cancelled in a case where the rendering is not completed in an amount of time equal to or shorter than the predetermined threshold value. In a case where the rendering is cancelled, a virtual viewpoint image that has been generated up to the point of cancellation is transmitted to the output unit 140. Furthermore, among foreground objects, a face and a jersey number may be identified, so as to render the face and the jersey number at a high resolution and omit coloring of things other than the face and the jersey number.

As explained above, the processing performed in the present embodiment includes omitting rendering in accordance with priority of the area of each model constituting a virtual viewpoint image, depending on the process load required for rendering the virtual viewpoint image. For example, foreground models are preferentially rendered and rendering of background models with low priority may be omitted, depending on the process load. According to such processing, generation of a virtual viewpoint image can be completed in processing time equal to or shorter than a predetermined threshold value.

Third Embodiment

In the third embodiment, an explanation is given of a method for simplifying a process of coloring the foreground, depending on the process load required for rendering a virtual viewpoint image. In the same manner as the first embodiment, it is assumed that the process load is the proportion of foreground objects to a virtual viewpoint image. Further, it is assumed that processing time for the process of coloring foreground objects increases with the number of cameras.

Figure 7A:
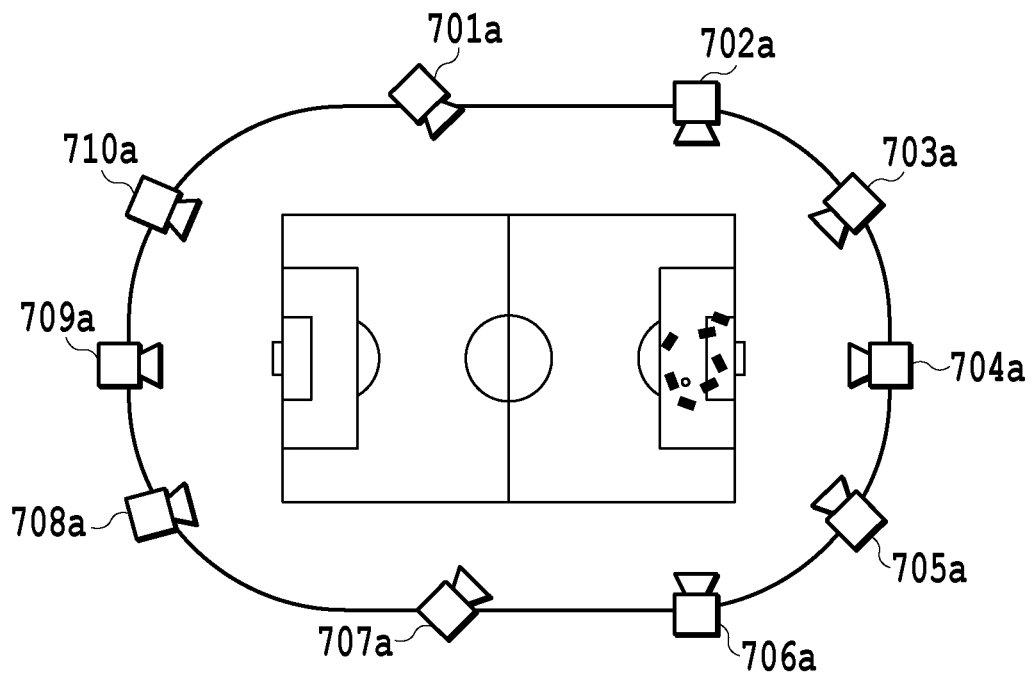
FIGS. 7A and 7B are schematic diagrams of changing the number of cameras used for coloring.
Figure 7B:
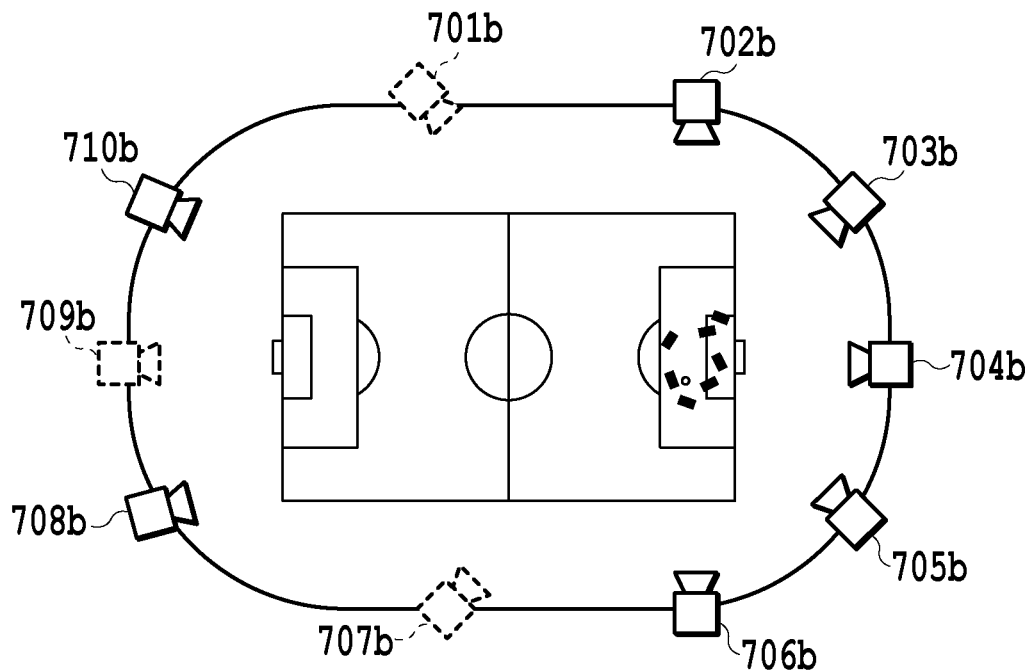

FIGS. 7A and 7B are schematic diagrams of changing the number of cameras used for coloring foreground objects. Each of the cameras 701 through 710 is a camera in the camera group 20, and a captured image of each camera is used for coloring the foreground. FIG. 7A is a diagram in a case where the virtual viewpoint image generating unit 130 determines that generation of a virtual viewpoint image is to be completed in an amount of time equal to or shorter than a predetermined threshold value, based on process load information. That is, as illustrated in FIG. 7A, a process of coloring foreground objects is performed by use of all the cameras. Contrarily, FIG. 7B is a diagram in a case where the virtual viewpoint image generating unit 130 determines that generation of a virtual viewpoint image requires an amount of time exceeding a predetermined threshold value, based on process load information. In FIG. 7B, the process of coloring foreground objects is performed by use of cameras other than the cameras 701b, 707b, and 709b, instead of all the cameras. Note that the omitted cameras are merely examples and are not limited to as exemplified in FIG. 7B. As described above, it is possible to shorten processing time for coloring the foreground by reducing the number of cameras to be used, instead of using all the cameras for the process of coloring foreground objects. As a result, the virtual viewpoint image can be generated in an amount of time equal to or shorter than the predetermined threshold value.

Figure 8:
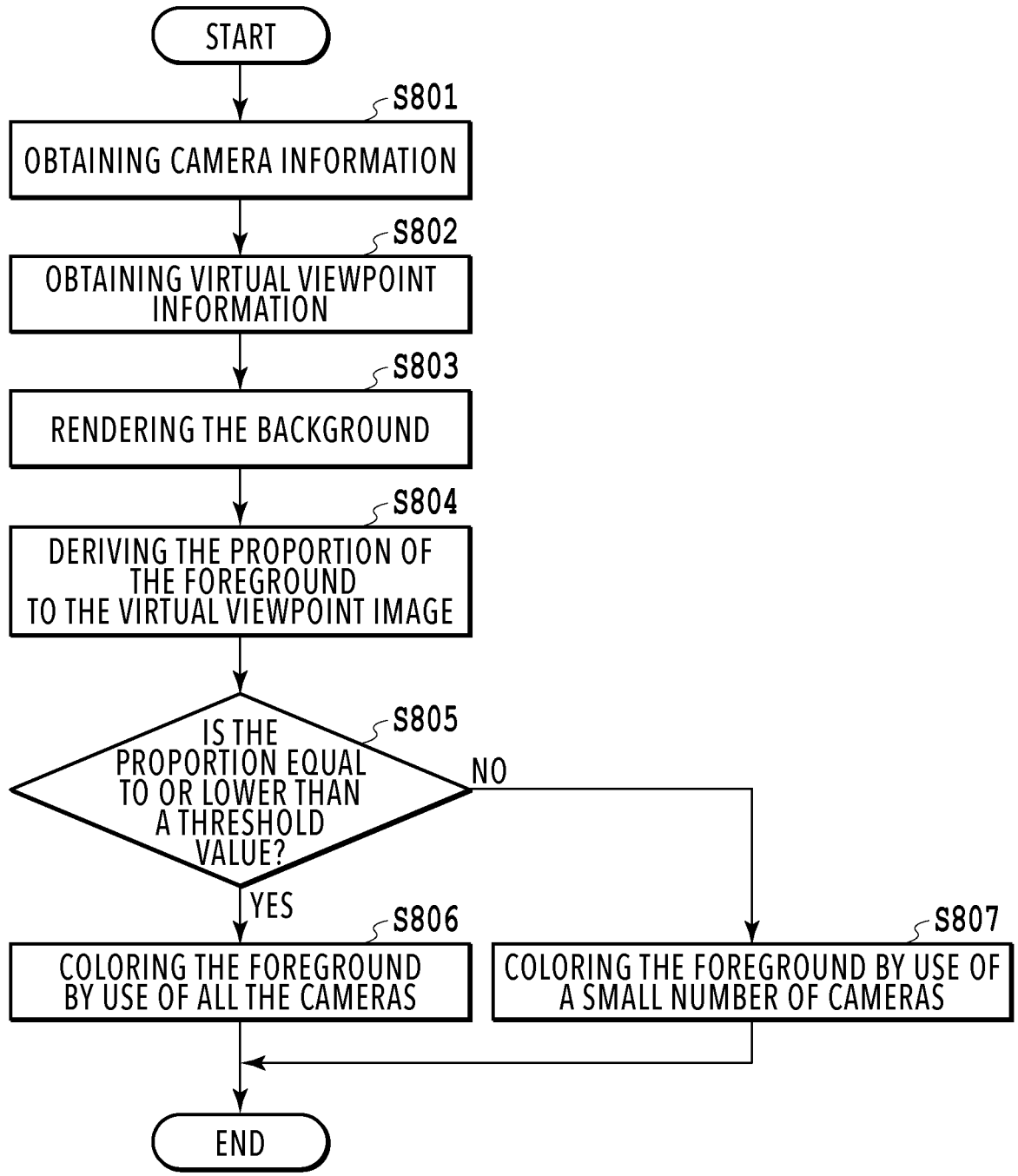
FIG. 8 is a flowchart illustrating an example of image processing.

FIG. 8 is a flowchart for explaining the flow of the processing in the third embodiment. Steps S801 and S802 are the same as Steps S401 and S402 of the first embodiment. Step S803 is the same as Step S605 of the second embodiment. Step S804 is the same as Step S403 of the first embodiment.

At Step S805, the virtual viewpoint image generating unit 130 determines whether the process load, which is indicated by the process load information obtained from the process load information obtaining unit 120, is equal to or less than a predetermined threshold value. For example, the virtual viewpoint image generating unit 130 determines whether the proportion (i.e., foreground rate) of the foreground objects to the virtual viewpoint image, which is obtained at Step S804, is equal to or lower than a predetermined threshold value. In a case where the proportion is equal to or lower than the predetermined threshold value, the processing proceeds to Step S806, and otherwise, the processing proceeds to Step S807.

At Step S806, the physical camera number determining unit 138 determines to use all the cameras as the number of cameras to be used for coloring the foreground objects. Then, the instruction is output to the 3D model coloring processing unit 134. The 3D model coloring processing unit 134 performs a coloring process by use of all the cameras for coloring the foreground objects. Contrarily, at Step S807, the physical camera number determining unit 138 determines to use a small number of cameras as the number of cameras to be used for coloring the foreground objects. Then, the instruction is output to the 3D model coloring processing unit 134. The 3D model coloring processing unit 134 performs a coloring process by use of the small number of cameras as instructed for coloring the foreground.

Note that, although the physical camera number determining unit 138 changes the number of physical cameras to be used for coloring the foreground objects in the present embodiment, the present embodiment is not limited thereto. For example, the number of cameras to be used for estimating the 3D shapes of foreground objects may be changed. Furthermore, the number of cameras to be used for coloring a background may be changed, etc. Moreover, a face and a jersey number may be identified, so as to perform coloring of the face and jersey number by use of a large number of cameras and perform coloring of things other than the face and the jersey number by use of a small number of cameras.

As explained above, the processing performed in the present embodiment includes changing cameras to be used for coloring foreground objects in accordance with the process load required for rendering a virtual viewpoint image. That is, the number of captured images to be used for generating the image of an object is controlled as an object displaying manner control, which aims to prevent an amount of time related to the process of generating a virtual viewpoint image from exceeding a threshold value. According to such processing, it is possible to complete generation of a virtual viewpoint image in processing time equal to or shorter than a predetermined threshold value.

Fourth Embodiment

In the fourth embodiment, an explanation is given of a configuration in which a parameter related to rendering of a virtual viewpoint image is changed in response to an instruction by an operator.

Figure 9:
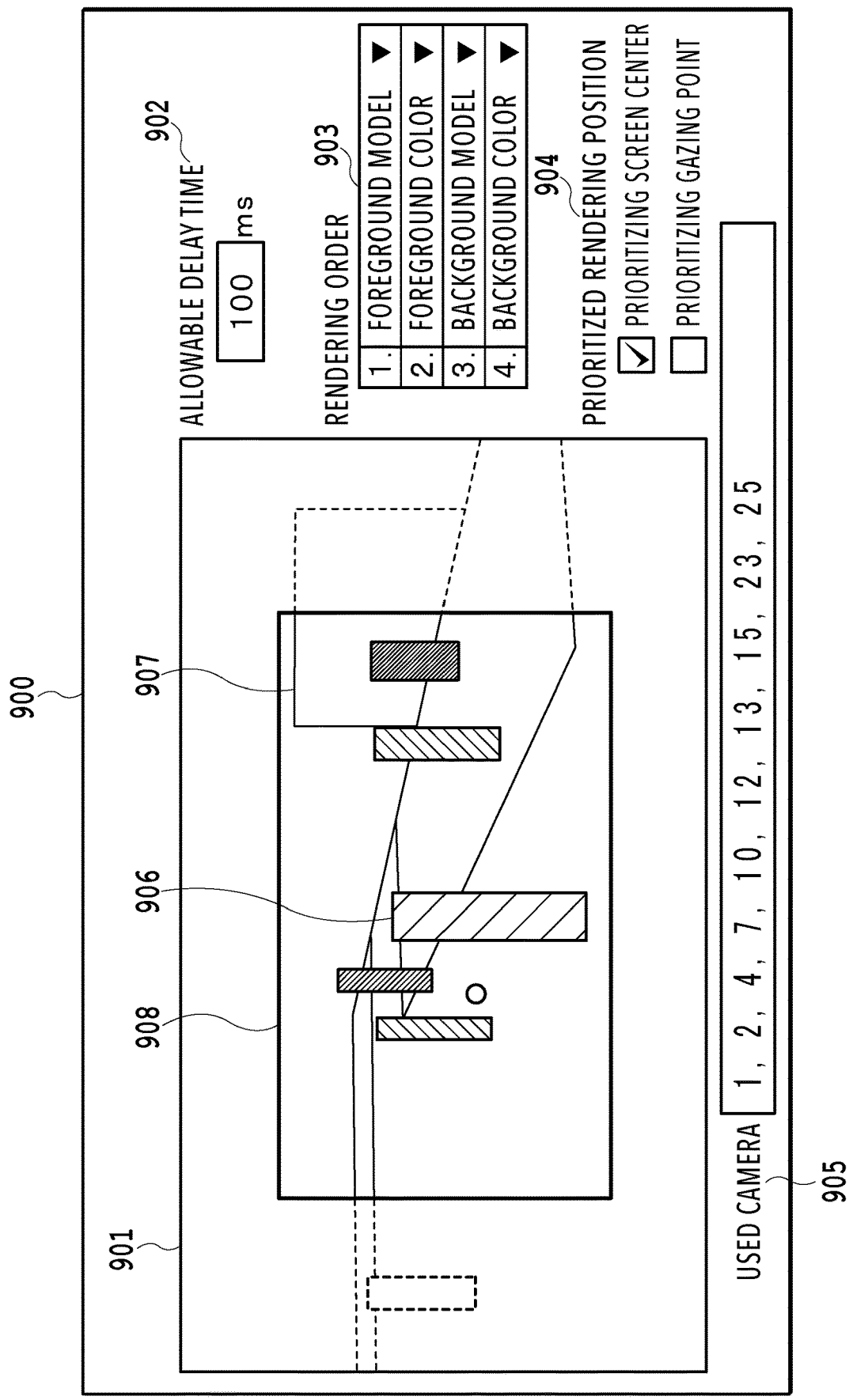
FIG. 9 is a schematic diagram of a user interface (UI) for generating a virtual viewpoint image.

FIG. 9 is a schematic diagram of a UI screen 900 on which an operator changes a parameter related to rendering of a virtual viewpoint image. The UI screen 900 is displayed on the display device 40 in accordance with display control by the image processing apparatus 10. The UI screen 900 includes an area for displaying the virtual viewpoint image 901, which is output from the output unit 140. Further, the UI screen 900 includes setting items of an allowable delay time 902, a rendering order 903, a prioritized rendering position 904, and a used camera 905. Noted that the present embodiment is not limited thereto, and the UI screen 900 may be provided with items or functions for adjusting and setting parameters such as the focal length of a virtual camera. An operator determines the position and orientation of a virtual viewpoint by use of the input device 30 and instructs the image processing apparatus 10 to generate a virtual viewpoint image while watching the virtual viewpoint image 901 displayed on the display device 40. That is, virtual viewpoint information is output from the input device 30 to the image processing apparatus 10. It is assumed that the objects to be rendered in the virtual viewpoint image 901 of FIG. 9 are the foreground object 906 and the background 907.

In the item of the allowable delay time 902, the operator can designate a threshold value of delay time that the operator can tolerate. In accordance with the amount of time that is input by the operator in the allowable delay time 902, the image processing apparatus 10 dynamically changes parameters related to rendering of the virtual viewpoint image, so as to generate the virtual viewpoint image within an allowable delay time.

The operator can designate settings of the rendering order 903, the prioritized rendering position 904, and the used camera 905, respectively, as parameters related to rendering of the virtual viewpoint image 901. Note that parameters designated by the operator are not limited to the above and may be, for example, the focal length of a virtual camera.

In the setting item of the rendering order 903, the operator can designate the rendering order of a foreground model (single color), a foreground color, a background model (single color), and a background color for generating the virtual viewpoint image. That is, priority is set for each object type such as a foreground object or a background object. Note that the object type is not limited thereto, and the shadow of an object, etc., may be included. Further, a user may be able to designate the priority of each object. The virtual viewpoint image generating unit 130 determines whether the virtual viewpoint image can be generated by the allowable time designated in the allowable delay time 902, based on process load information obtained by the process load information obtaining unit 120. In a case where the virtual viewpoint image generating unit 130 determines that the virtual viewpoint image cannot be generated, the rendering omitting unit 137 transmits an instruction to omit rendering in order starting from the processing to be performed at the end according to the setting in the rendering order 903. For example, below is a case in which the foreground rate obtained by the process load information obtaining unit 120 is a predetermined value P. The virtual viewpoint image generating unit 130 determines, based on the foreground rate P, that a time T1 is required for generating the foreground model and a time T2 is required for the foreground coloring process. In addition, the virtual viewpoint image generating unit 130 determines that a time T3 is required for obtaining the background model and a time T4 is required for the background model coloring process. Then, the virtual viewpoint image generating unit 130 accumulates each processing time in the order designated in the rendering order 903 and determines whether the processing time exceeds the allowable time designated in the allowable delay time 902. In a case of exceeding the allowable time, the rendering omitting unit 137 transmits an instruction to omit processing of the processing item and the subsequent processing items according to the order designated in the rendering order 903.

In the setting item of the prioritized rendering position 904, the operator can designate a place from which rendering of the virtual viewpoint image is initiated. In a case where "PRIORITIZING SCREEN CENTER" is designated, for example, the 3D model coloring processing unit 134 or the background 3D model coloring processing unit 135 renders the inside of the screen center area 908 of the virtual viewpoint image 901 in advance of the outside of the screen center area 908. That is, a high priority is set for an object close to the center of the field of view of a virtual viewpoint according to virtual viewpoint information, so that rendering is performed in order starting from the model of an object with a high priority. Then, in a case where the virtual viewpoint image cannot be generated by the time designated in the allowable delay time 902, the rendering omitting unit 137 can omit rendering of the outside of the screen center area 908. Alternatively, the resolution changing unit 136 may transmit, to the 3D model coloring processing unit 134 or the background 3D model coloring processing unit 135, an instruction to render the outside of the screen center area 908 at a low resolution. In a case where "PRIORITIZING GAZING POINT" is designated, for example, a point designated on the virtual viewpoint image 901 by the operator or a predetermined position to which multiple cameras are directed is set as a gazing point, and a high priority is set to an object near the gazing point, so that rendering of the object is preferentially performed. Alternatively, in a case where the input device 30 is capable of inputting information about the direction of the operator's eyes, the position of the gazing point may be determined by use of the information about the direction of the operator's eyes. In this way, priority of an object is determined based on the 3D position of the object in the image capturing area, so that a display manner of the object is controlled based on the priority.

In the setting item of the used camera 905, the operator can designate cameras to be used for coloring the foreground object 906. In a case where the virtual viewpoint image cannot be generated by the time designated in the allowable delay time 902, the physical camera number determining unit 138 reduces the number of cameras to be used and the 3D model coloring processing unit 134 performs coloring of the foreground model by use of the reduced number of cameras.

Note that the items designated in the setting items of the rendering order 903, the prioritized rendering position 904, and the used camera 905 can be combined in operation. For example, rendering may be performed by use of the cameras designated in the used cameras 905 from the position designated in the prioritized rendering position 904 in the order designated in the rendering order 903. It is possible that only items designated by the operator can be combined.

As described above, each of the designated parameters, which is designated through the UI screen 900, is output from the input device 30 to the image processing apparatus 10. The virtual viewpoint information obtaining unit 110 obtains the designated parameters, which are designated through the UI screen 900 and transmitted in the above way, as the virtual viewpoint information. Further, in the first through third embodiments, processing to determine an area of a model for which resolution is changed, processing to determine an area of a model for which a rendering process is omitted, or processing to determine the number of cameras to be used, etc., may be performed in accordance with the designated parameters.

As explained above, in the present embodiment, responding to a demand from users for watching a virtual viewpoint image in real-time (i.e., low-delay), it is possible for an operator to change a parameter related to rendering, which affects image quality of a virtual viewpoint image. According to such processing, a virtual viewpoint image as desired by an operator can be generated.

Noted that the method for drawing objects may be different, depending on the priority of an object and the process load. For example, in a case of drawing a shadow of an object with a low priority, the virtual viewpoint image generating unit 130 may determine whether to insert a shadow image prepared in advance into a virtual viewpoint image or to insert a shadow image generated based on the shape of a foreground object into a virtual viewpoint image, depending on the process load.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to provide a technique for achieving both reduction in delay caused by rendering of a virtual viewpoint image and reduction in excessive deterioration in image quality of a virtual viewpoint image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-005732, filed Jan. 17, 2018, which is hereby incorporated by reference wherein in its entirety.

What is claimed is:

1. An image processing apparatus comprising:
one or more memories storing instructions; and
one or more processors executing the instructions to:
determine a priority of an object in an image capturing area captured by a plurality of image capturing devices from a plurality of directions;
determine a parameter used for generation of a virtual viewpoint image based on the determined priority of the object, so that processing time related to generation of the virtual viewpoint image does not exceed a threshold value determined based on an operation by a user; and
generate a virtual viewpoint image based on the determined parameter, based on a plurality of images obtained by the plurality of image capturing devices, and based on view point information for specifying a position of a virtual viewpoint and a view direction from the virtual viewpoint.

2. The image processing apparatus of claim 1, wherein the priority of the object is determined based on a three-dimensional position of the object in the image capturing area.

3. The image processing apparatus of claim 2, wherein the one or more processors further execute the instructions
to obtain viewpoint information, and
wherein the priority of the object is determined based on the obtained viewpoint information and based on the three-dimensional position of the object in the image capturing area.

4. The image processing apparatus of claim 3, wherein a priority of a first object is set to a higher value than a priority of a second object, the first object being located in a field of view corresponding to the viewpoint information, the second object being located farther, compared to the first object, from a center of the field of view.

5. The image processing apparatus of claim 2, wherein the one or more processors further execute the instructions
to obtain information for specifying by positions and directions of the plurality of image capturing devices, and
wherein a priority of a first object in the image capturing area is set to a higher value than a priority of a second object, the second object being located farther, compared to the first object, from a predetermined position to which the plurality of image capturing devices are directed.

6. The image processing apparatus of claim 1, wherein a priority for each object type is determined based on an operation by a user.

7. The image processing apparatus of claim 6, wherein object types whose priority is determined include a foreground object, a background object, and a shadow of an object.

8. The image processing apparatus of claim 1, wherein the parameter used for generation of the virtual viewpoint image is determined further based on at least one of a number and a size of objects included in the virtual viewpoint image.

9. The image processing apparatus of claim 1, wherein the parameter used for generation of the virtual viewpoint image is determined further based on a process load for generating the virtual viewpoint image.

10. The image processing apparatus of claim 1, wherein the determination of the parameter used for generation of the virtual viewpoint image includes at least one of determination of a resolution related to the object and determination of whether or not to display the object.

11. The image processing apparatus of claim 1, wherein the determination of the parameter used for generation of the virtual viewpoint image includes determination of a number of captured images to be used for generating the virtual viewpoint image.

12. A image processing apparatus comprising:
one or more memories storing instructions; and
one or more processors executing the instructions to:

determine a priority of an object in a image capturing area captured by a plurality of image capturing devices from a plurality of directions;

determine a parameter used for generation of a virtual viewpoint image based on the determined priority of the object, so that processing time related to generation of the virtual viewpoint image does not exceed a threshold value; and generate a virtual viewpoint image based on the determined parameter, based on a plurality of images obtained by the plurality of image capturing devices, and based on view point information for specifying a position of a virtual viewpoint and a view direction from the virtual viewpoint, wherein, in a case where a size of an area occupied by one or more foreground objects in the generated virtual viewpoint image is larger than a predetermined threshold value, a resolution of a background object in the generated virtual viewpoint image is lower, compared to a case where the size of the area occupied by one or more foreground objects in the generated virtual viewpoint image is equal to or smaller than the predetermined threshold value.

13. The image processing apparatus of claim 1, wherein the one or more processors further execute the instructions to obtain information for specifying three-dimensional shapes of a plurality of objects in the image capturing area, based on the plurality of images obtained by the plurality of image capturing devices, and wherein the virtual viewpoint image is generated based on information for specifying a three-dimensional shape of an object selected from among the plurality of objects, based on the determined priority of the object.

14. The image processing apparatus of claim 1, wherein the one or more processors further execute the instructions to display an image for allowing a user to designate at least one of the priority of the object and a priority of an object type.

15. An image processing method comprising:

determining a priority of an object in a image capturing area captured by a plurality of image capturing devices from a plurality of directions;

determining a parameter used for generation of a virtual viewpoint image based on the determined priority of the object, so that processing time related to generation of the virtual viewpoint image does not exceed a threshold value determined based on an operation by a user; and generating a virtual viewpoint image based on the determined parameter, based on a plurality of images obtained by the plurality of image capturing devices, and based on view point information for specifying a position of a virtual viewpoint and a view direction from the virtual viewpoint.

16. The image processing method of claim 15, wherein the priority of the object is determined based on three-dimensional position of the object in the image capturing area.

17. The image processing method of claim 15, wherein the parameter used for generation of the virtual viewpoint image is determined further based on at least one of a number and a size of objects included in the virtual viewpoint image.

18. A non-transitory computer readable storage medium storing a program which performs an image processing method comprising:

determining a priority of an object in a image capturing area captured by a plurality of image capturing devices from a plurality of directions;

determining a parameter used for generation of a virtual viewpoint image based on the determined priority of the object, so that processing time related to generation of the virtual viewpoint image does not exceed a threshold value determined based on an operation by a user; and generating a virtual viewpoint image based on the determined parameter, based on a plurality of images obtained by the plurality of image capturing devices, and based on view point information for specifying a position of a virtual viewpoint and a view direction from the virtual viewpoint.

19. The image processing apparatus of claim 1, wherein the priority of the object is determined based on at least one of a number and a size of objects included in a virtual viewpoint image.

* * * * *